(12) United States Patent
Hsiao et al.

(10) Patent No.: US 11,711,305 B2
(45) Date of Patent: Jul. 25, 2023

(54) METHOD AND SYSTEM FOR PACKET PROCESSING ACCORDING TO A TABLE LOOKUP

(71) Applicant: Core Keepers Investment Inc.

(72) Inventors: Yi-Lung Hsiao, Taipei (TW); Chih-Liang Chou, Taipei (TW)

(*) Notice: Subject to any disclaimer, the term of this patent is extended or adjusted under 35 U.S.C. 154(b) by 246 days.

(21) Appl. No.: 17/380,013

(22) Filed: Jul. 20, 2021

(65) Prior Publication Data

US 2022/0029923 A1    Jan. 27, 2022

Related U.S. Application Data

(60) Provisional application No. 63/055,345, filed on Jul. 23, 2020.

(51) Int. Cl.
*H04L 47/24* (2022.01)
*H04L 69/22* (2022.01)

(52) U.S. Cl.
CPC ............. *H04L 47/24* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 2018/0287935 | A1* | 10/2018 | Wang | H04L 12/4625 |
| 2018/0287939 | A1* | 10/2018 | Kumagai | H04L 45/748 |
| 2020/0389378 | A1* | 12/2020 | Shahbaz | H04L 12/1886 |

FOREIGN PATENT DOCUMENTS

| | | |
|---|---|---|
| CN | 106170956 A | 11/2016 |
| TW | I1291622 B | 12/2007 |
| TW | 201933831 A | 8/2019 |
| TW | I692948 A | 5/2020 |
| TW | I692948 B | 5/2020 |

OTHER PUBLICATIONS

CNIPA, First Nonfinal Office Action, dated Nov. 30, 2022.
TIPO, Search Report, dated Mar. 23, 2022.
TIPO, Notice of Allowance, dated Mar. 24, 2022.
TIPO, Non Final Office Action, dated Mar. 21, 2022.
Office Action from the Taiwan Intellectual Property Office, dated Mar. 21, 2022.

* cited by examiner

*Primary Examiner* — Robert M Morlan
(74) *Attorney, Agent, or Firm* — Opes IP Consulting Co. Ltd.

(57) ABSTRACT

The present invention provides a method for packet processing according to a lookup table, comprising: receiving a packet, wherein the packet includes a packet header, and the packet header consists of control information; providing a lookup table with M entries, wherein each entry includes N conditions and a result/action indicator, and the M entries are sorted in a priority order; matching the information with the N conditions; and applying the result/action indicator in the matched entry with the highest priority on the packet.

12 Claims, 8 Drawing Sheets

| | Condition 1 | Condition 2 | ... | Condition N | Result/Action |
|---|---|---|---|---|---|
| Entry 1 | Condition 1 | Condition 2 | ... | Condition N | Result/Action |
| Entry 2 | Condition 1 | Condition 2 | ... | Condition N | Result/Action |
| ... | ... | ... | ... | ... | ... |
| Entry M | Condition 1 | Condition 2 | ... | Condition N | Result/Action |

Table 200

Priority: High → Low

Fig. 2A

METHOD AND SYSTEM FOR PACKET PROCESSING ACCORDING TO A TABLE LOOKUP

CROSS REFERENCE TO RELATED APPLICATION

The present application claims priority to U.S. Provisional Application Ser. No. 63/055,345, filed on Jul. 23, 2020, which are hereby incorporated by reference in their entirety.

FIELD

The present invention relates to a method and system for packet processing according to a table lookup and, more particularly, to a method and system for hardware table lookup to search prioritized, multi-condition and wildcard-inclusive table entries.

BACKGROUND

Traditionally, there are several prior methods to implement a lookup table. One is the so-called CAM (Content-Addressable Memory), and the other is by using a Hash Function to calculate the table index.

Content-addressable memory (CAM) may be referred to a special type of computer memory used in certain very-high-speed searching applications. It is also known as associative memory or associative storage, and it includes input search data against a table of stored data, and returns the address of matching data.

CAM is also frequently utilized in networking devices since CAM speeds up forwarding information base and routing table operations. This kind of associative memory is used in cache memory as well. In associative cache memory, both address and content are stored side by side. When the address matches, the corresponding content is fetched from cache memory.

Further, a hash function is any function that can be used to map data of arbitrary size to fixed-size values. The values returned by a hash function are called hash values, hash codes, digests, or simply hashes. The values are usually used to index a fixed-size table called a hash table. Use of a hash function to index a hash table is called hashing or scatter storage addressing.

However, using CAM or hash solution incurs higher cost and circuit complexity. In terms of functionality, searching a small-size lookup table doesn't necessarily require CAM or hash solution. In some cases, it doesn't fit the product requirements while considering the target market and the selling price.

SUMMARY OF THE DISCLOSURE

The present invention relates to a method and system for packet processing according to a table lookup and, more particularly, to a method and system for hardware table lookup to search prioritized, multi-condition and wildcard-inclusive table entries.

According to the present invention, a method for packet processing according to a lookup table is provided. The method comprises receiving a packet, wherein the packet includes a packet header, and the packet header consists of control information; providing a lookup table with M entries, wherein each entry includes N conditions and a result/action indicator, and the M entries are sorted in a priority order; matching the information with the N conditions; and applying the result/action indicator in the matched entry with the highest priority rule on the packet.

Preferably, for each information in the packet header, a bit map array is given after the matching.

Preferably, the bit map arrays from each information in the packet header are processed with a logic OR procedure to generate an aggregated bit map array.

Preferably, the aggregated bit map arrays are processed with a logic AND procedure to generate a final aggregated bit map array with the priority order.

Preferably, the result/action indicator indicates to let the packet pass, drop the packet, forward the packet, or modify the contents of packet headers.

Preferably, the information of the packet header includes an IP version, a source/destination IP address, a time-to-live count, a source/destination MAC address, a VLAN tag, a TCP/UDP source/destination port number, etc.

Preferably, the priority order is sorted by a software.

According to the present invention, a system for packet processing according to a lookup table us provided. The system comprises a receiver for receiving a packet, wherein the packet includes a packet header, and the packet header includes control information; a memory, storing a lookup up table with M entries, wherein each entry includes N conditions and a result/action indicator, and the M entries are sorted in a priority order; and a processor, wherein the processor matches the information with the N conditions, and applies the result/action indicator with the highest priority rule on the packet.

Preferably, for each information in the packet header, a bit map array is given after the matching.

Preferably, the bit map arrays from each information in the packet header are processed with a logic OR procedure to generate an aggregated bit map array.

Preferably, the aggregated bit map arrays are processed with a logic AND procedure to generate a final aggregated bit map array with the priority order.

Preferably, the result/action indicator indicates to let the packet pass, drop the packet, forward the packet, or modify the contents of the packet headers.

Preferably, the information of the Packet header includes an IP version, a source/destination IP address, a time-to-live count, a source/destination MAC address, a VLAN tag, a TCP/UDP source/destination port number, etc.

Preferably, the priority order is sorted by a software.

BRIEF DESCRIPTION OF THE DRAWINGS

FIGS. 2A-2D illustrate a general embodiment of the present invention.

DETAILED DESCRIPTION

Unless defined otherwise, all technical and scientific terms used herein have the same meanings as commonly understood by one of skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
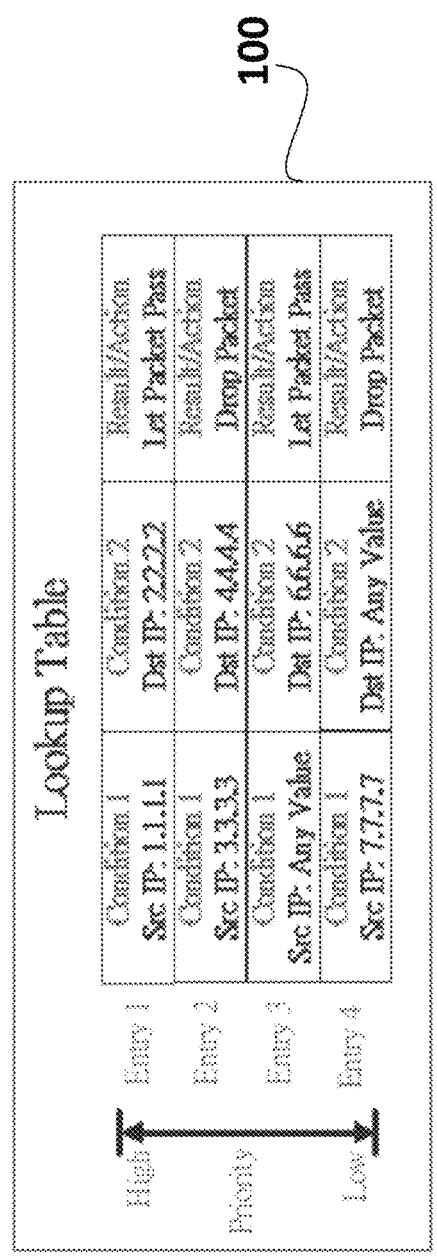
FIGS. 1A-1D illustrate an exemplary embodiment of the present invention.
Figure 1A:
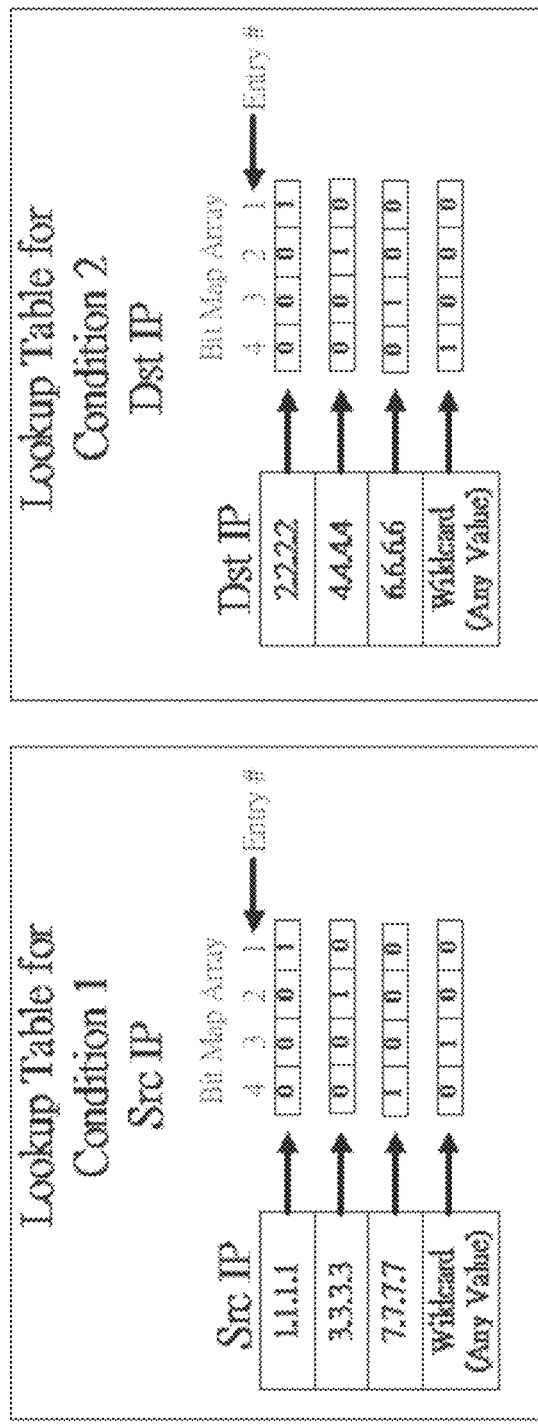

Reference is made to FIGS. 1A-1D, which illustrate an embodiment of the present invention. Reference is firstly made to FIG. 1A, which shows a lookup table 100. The table 100 includes four entries, each labelled as Entry 1, Entry 2, Entry 3 and Entry 4. The four entries is pre-prioritized, and the priority is from high to low, i.e., from Entry 1 to Entry 4. Each entry includes two conditions and a result/action indicator. Each condition is labelled as Condition 1 and Condition 2.

It should be noted that the number of entries is not limited to only four, and the number of conditions is not limited to only two. The number of entries and conditions in the present embodiment is mainly for exemplary purpose, and thus should not limit the scope of the present invention.

In the present embodiment, Condition 1 stands for source IP (hereinafter, "Src IP") and Condition 2 stands for destination IP (hereinafter, "Dst IP"). As can be seen in FIG. 1A, for Src IP, it can also be understood as Lookup table for Condition 1 Src IP 101, and for Dst IP, it can also be understood as Lookup table for Condition 2 Src IP 102. Further, the lookup table 100 may be implemented on a memory of any kind.

In Condition 1 of Entry 3, the condition is "Src IP: Any Value", such condition means no matter what value comes in, the matching will always be true. Alternatively, it can also be understood that no matter what value comes in, the matching will always be established (or always match). The Any Value can also be referred to as wildcard, as can be seen in Lookup table for Condition 1 Src IP 101 and Lookup table for Condition 2 Dst IP 102.

Figure 1B:
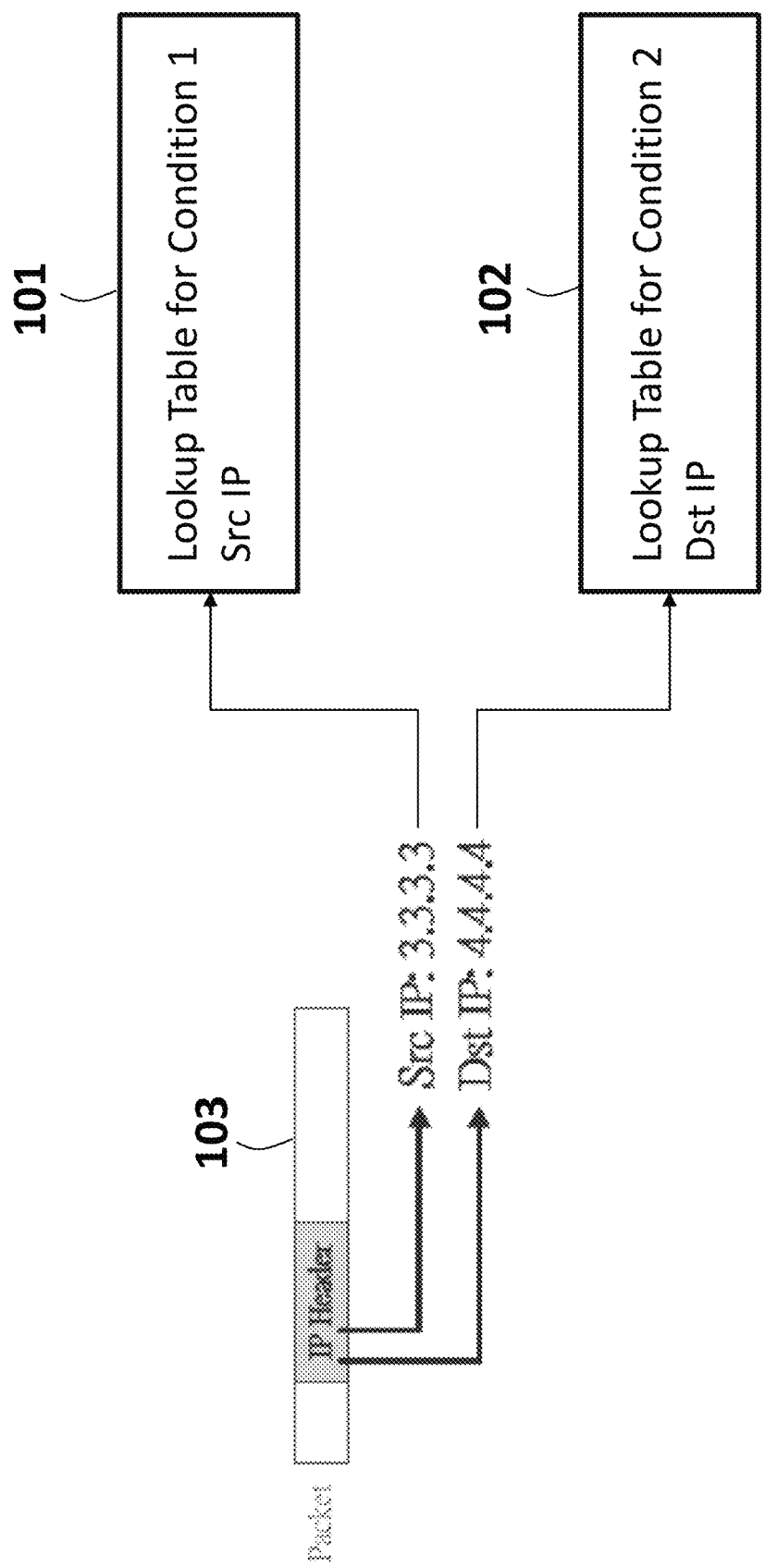

Reference is next made to FIG. 1B, a packet 103 is received. The packet 103 includes a packet header information (e.g., IP header) with Src IP 3.3.3.3 and Dst IP 4.4.4.4 (in some other embodiment, packet header may include other information, such as source MAC address, destination MAC address, Ether type information, etc.). According to the present invention, the IP header's Src IP 3.3.3.3 will be processed to determine such Src IP matches which entry's Condition 1, and the IP header's Dst IP 4.4.4.4 will be processed to determine such Dst IP matches which entry's Condition 2. As can be seen in FIG. 1B, IP header's Src IP 3.3.3.3 will be processed according to Lookup table for Condition 1 Src IP 101, and IP header's Dst IP 4.4.4.4 will be processed according to Lookup table for Condition 2 Src IP 102.

Figure 1C:
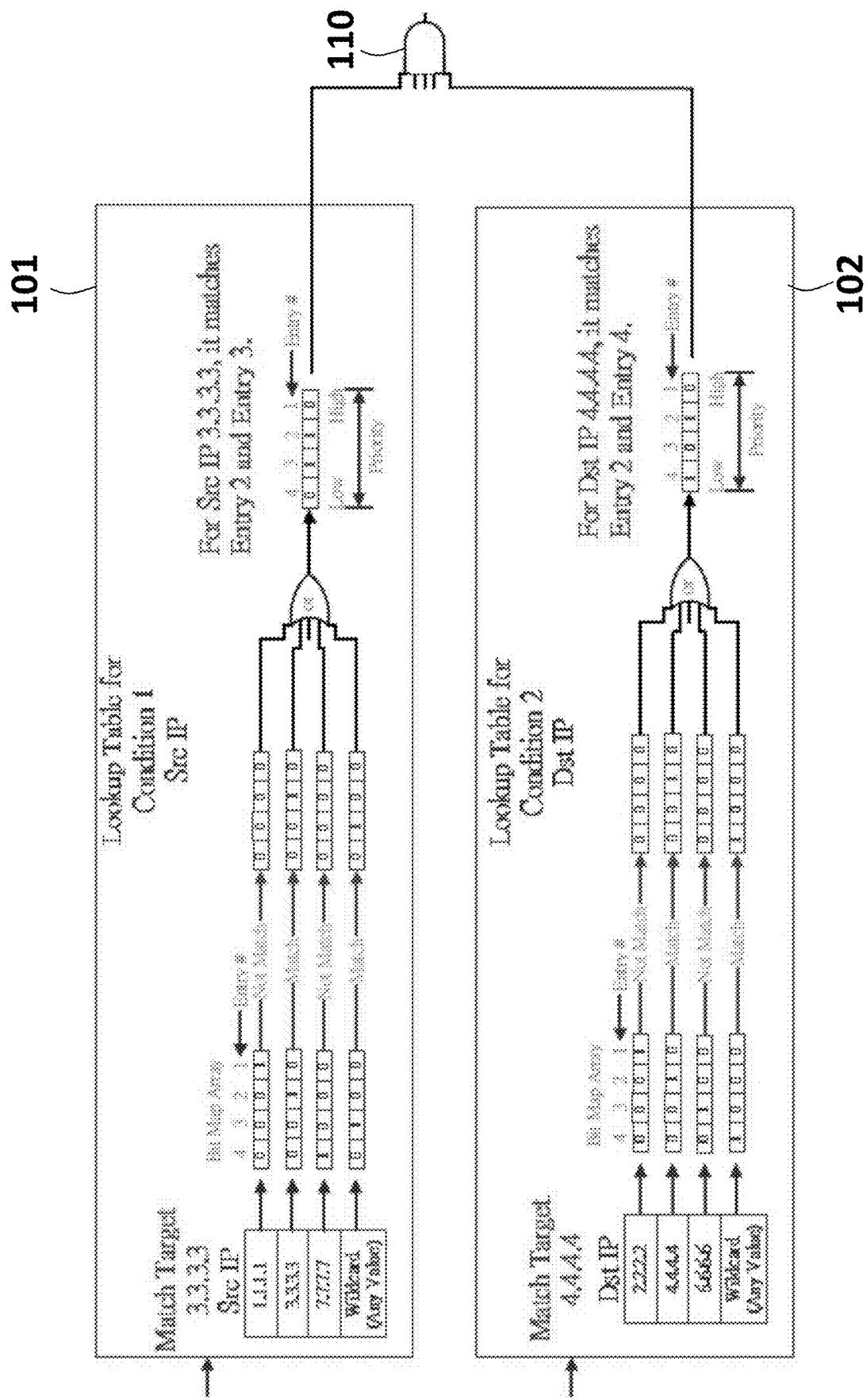

Reference is next made to FIG. 1C. Since the IP header's Src IP is 3.3.3.3, such Src IP does not match with Entry 1's Condition 1, matches with Entry 2's Condition 1, does not match with Entry 4's Condition 1, and matches with Entry 3's Condition 1 because such condition is to be wildcard (any value will match as described above).

Further referring to the bit map array of Lookup table for Condition 1 Src IP 101, for Entry 1, there's no match, therefore the bit map array may be expressed as 0.0.0.0. For Entry 2, there's a match, therefore the bit map array may be expressed as 0.0.1.0. For Entry 4, there's no match, therefore the bit map array may be expressed as 0.0.0.0. For Entry 3, there a match, therefore the bit map array may be expressed as 0.1.0.0. The four bit map arrays are then computed through an OR logic gate. Therefore, For IP header's Src IP 3.3.3.3, it matches Entry 2 and Entry 3, and this result can be reduced to an aggregated bit map array as 0.1.1.0.

Further referring to the bit map array of Lookup table for Condition 2 Dst IP 101, for Entry 1, there's no match, therefore the bit map array may be expressed as 0.0.0.0. For Entry 2, there's a match, therefore the bit map array may be expressed as 0.0.1.0. For Entry 3, there's no match, therefore the bit map array may be expressed as 0.0.0.0. For Entry 4, there a match, therefore the bit map array may be expressed as 1.0.0.0. The four bit map arrays are then computed through an OR logic gate. Therefore, For IP header's Dst IP 4.4.4.4, it matches Entry 2 and Entry 4, and this result can be reduced to an aggregated bit map array as 1.0.1.0.

Furthermore, the two aggregated bit map arrays, bit map array 0.1.1.0, and bit map array 1.0.1.0 are next processed through an AND logic gate 110, to implement the priority condition, as shown in FIG. 1C.

Figure 1D:
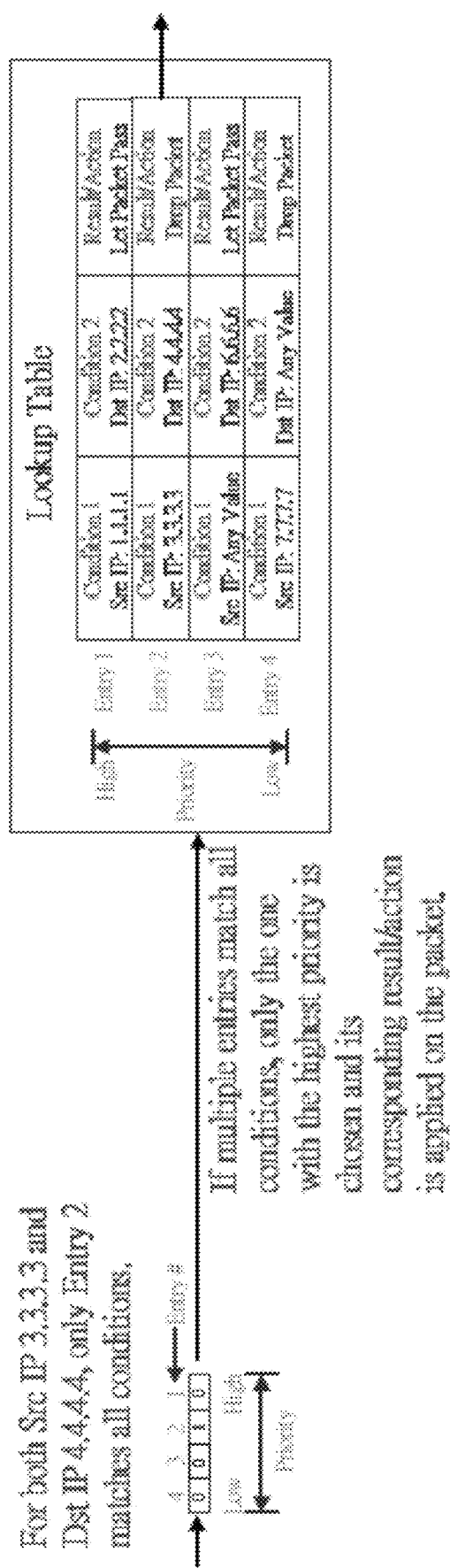

Reference is next made to FIG. 1D. Since each entry is prioritized and, in the present embodiment, the priority from Entry 1 to Entry 4 is from high to low, therefore, after the AND logical processing, the final bit map array will be as 0.0.1.0, as shown in FIG. 1D. That is to say, for IP header's 3.3.3.3 Src IP and 4.4.4.4 Dst IP, only Entry 2 matches all conditions. The bit may array may also be referred to as bit map vector.

According to the lookup table and the matching, the packet will be dropped, since the result/action of the matched entry is to drop the packet.

It should be noted that, if multiple entries match all conditions, only the one with the highest priority is selected and its corresponding result/action will be applied to the packet.

Moreover, the result/action is not limited to only "let packet pass" and "drop packet." The result/action may also be "modify the contents of the packet headers." People with ordinary skill in the art may modify or have other implementation with respect to such result/action.

It should also be noted that, a bit map index is generated after the lookup. Further, for each bit map index, it points to a bit map array (also known as bit map vector) stored in a memory space.

Figure 2B:
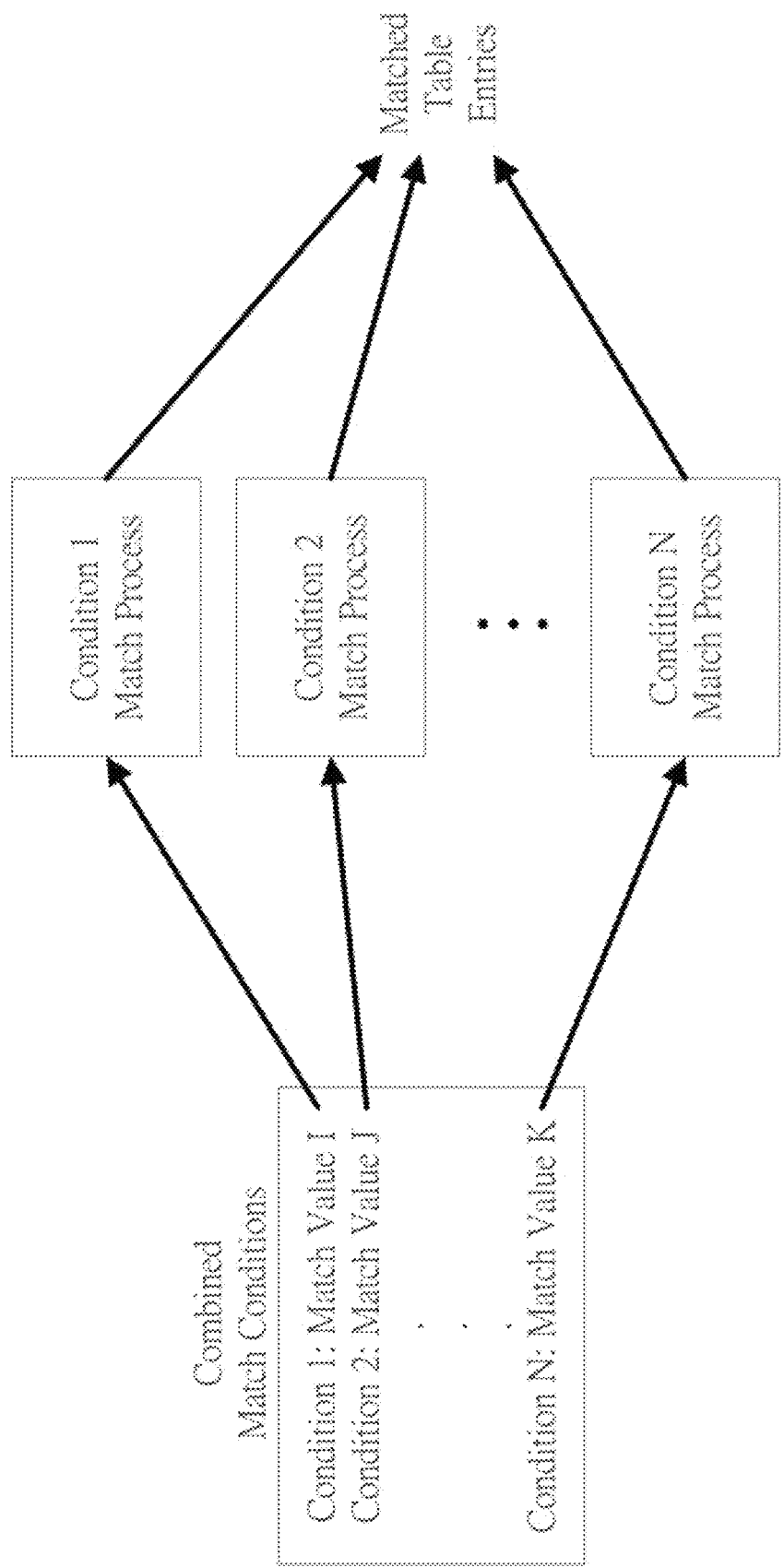

Reference is next made to FIGS. 2A-2D, which illustrate a general embodiment of the present invention, for general lookup table matching and the according packet processing procedure. As shown in FIG. 2A, the table 200 includes M entries, each labelled as Entry 1, Entry 2 . . . to Entry M. The priority is, from top to down (i.e., from Entry 1 to Entry M), from high to low. Each entry includes N conditions, labelled as Condition 1, Condition 2 . . . to Condition N. Each entry has a Result/Action area arranged after Condition N. For a table lookup operation, it is to find out the matched entry that satisfies multiple conditions and is with the highest priority.

The number of the entry is not limited. For example, the number of entry may be 20. Further, the number of condition is not limited. For example, the number of condition may be 30. People with ordinary skill in the art may change those numbers according to their requirements.

One of the general purposes of the present invention may be, to find out the corresponding result/action (i.e., how to deal with a packet) against combined search conditions. For one instance, to distinguish different kinds of network packets against combined fields of different kinds of packet headers and apply the corresponding action on the packets. For another instance, to find out the corresponding output port/queue for a packet against combined conditions. For a further instance, to design an event trigger mechanism where an event is triggered while multiple conditions assert.

Reference is next made to FIG. 2B, it is to be noted that, the priority of each table entry is sorted by software. The sorting is considered well-known to people with ordinary skill in the art, therefore relevant descriptions will be omitted for convenience. Further, a divide-and-conquer method is used to concurrently check each match condition against all specified match values in parallel.

Figure 2C:
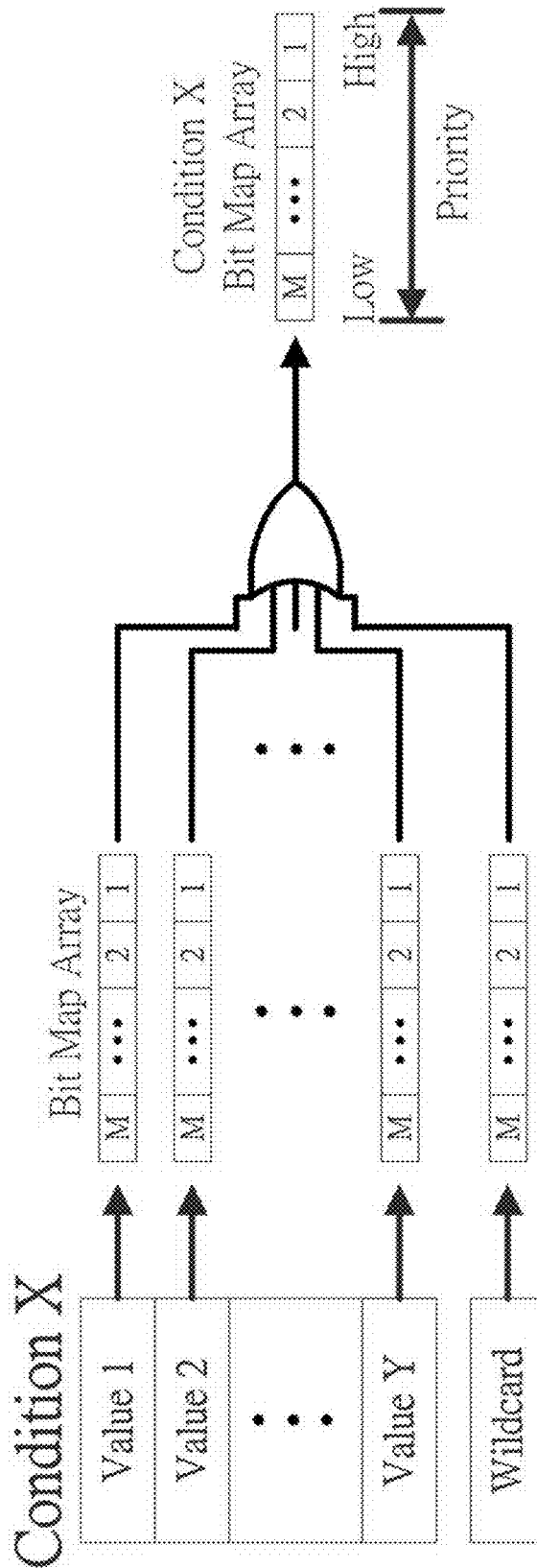

Reference is next made to FIG. 2C, each match value of a match condition has a corresponding bit map array that indicates which table entries request for exactly matching on the value. Further, each match condition has a corresponding wildcard bit map array that indicates which table entries are always satisfied with the condition.

As shown in FIG. 2C, for Condition X (Condition X could be Condition 1, Condition 2 . . . or Condition N), each Condition X of each entry is stored with a value (such as the condition as described in the previous embodiment, 4.4.4.4, 6.6.6.6, or other). The bit map array will then be processed by an OR logic gate, to generate an aggregated bit map array for Condition X, with priority indicated.

Figure 2D:
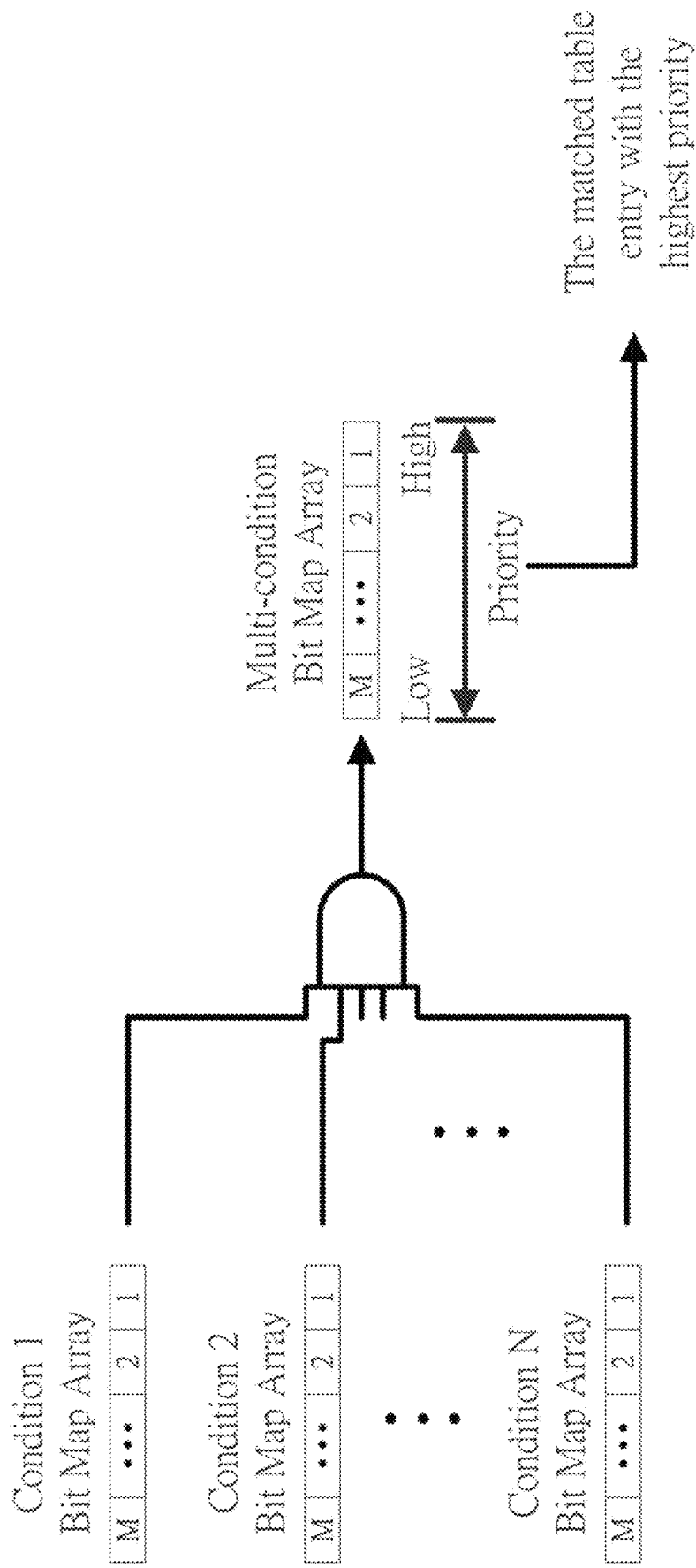

Reference is finally made to FIG. 2D, where each bit map array of each condition are processed through an AND logic gate. The packet will then be processed according to the result/action belonging to the matched entry with the highest priority.

Moreover, for a match condition, combine (bitwise or) all match values' bit map arrays and the wildcard bit map array to obtain a single-condition resulting bit map array that tells which table entries are satisfied with the match condition.

For all match conditions, combine (bitwise and) all single-condition resulting bit may arrays to obtain the final multi-condition resulting bit map array that tells which table entries are satisfied with all match conditions.

The sequence of a bit map array represents the priority of each table entry. Check the final multi-condition resulting bit map array to find out the matched entry with the highest priority.

For a table lookup operation, it is to find the matched entry that satisfies multiple conditions and is with the highest priority.

The priority order is defined in the bit map array after logic AND operation. The priority order can be either from MSB to LSB or from LSB to MSB, depending on the hardware implementation method. The priority order depends on the application requirement and the software is able to rearrange the order.

In sum, the present invention divides one large lookup table (logical) into several small lookup tables (physical), each of which is associated with a match condition of the table entry. Further, the so-called small lookup tables result from limited number of legitimate match values, and that is enough for some lookup applications. Thus, no CAM or hash solution is required for lookup operations.

In sum, the most suitable lookup algorithm is able to be applied on each table respectively for best performance, depending on each table's matching condition.

Further, the present invention may be applied to all sorts of communication and networking equipment. Further, the present invention may also be applied to all hardware designs that require table lookup operation with prioritized, multi-condition and wildcard-inclusive entries.

In sum, the present invention provides a scalable hardware table lookup method to search prioritized, multi-condition and wildcard-inclusive table entries, in which the prioritized table entries are sorted by software, and such design reduces hardware complexity and increases hardware performance.

Further, multiple conditions' match process are conducted concurrently to reduce table lookup response time, in the present invention.

Moreover, the wildcard-inclusive design provides the flexibility to specify a match value and hence increases the table utilization.

It also should be noted that, a packet header's control information may consist of MAC header, VLAN tag, IP header, TCP header, UDP header, etc. And the packet header is considered well-known to people with ordinary skill in the art.

The invention claimed is:

1. A method for packet processing according to a lookup table, comprising:
   receiving a packet, wherein the packet includes a packet header information, and the packet header includes control information;
   providing a lookup table with M entries, wherein each entry includes N conditions and a result/action indicator, and the M entries are sorted in a priority order;
   matching the information with the N conditions; and
   applying the result/action indicator in the matched entry with the highest priority on the packet,
   wherein for each information in the packet header, a bit map array is given after the matching.

2. The method for packet processing according to a lookup table according to claim 1, wherein the bit map arrays from each information in the packet header are processed with a logic OR procedure to generate an aggregated bit map array.

3. The method for packet processing according to a lookup table according to claim 2, wherein the aggregated bit map arrays are processed with a logic AND procedure to generate a final aggregated bit map array with the priority order.

4. The method for packet processing according to a lookup table according to claim 1, wherein the result/action indicator indicates to let the packet pass, drop the packet, forward the packet, or modify the contents of the packet headers.

5. The method for packet processing according to a lookup table according to claim 1, wherein the information of the packet header includes an IP version, a source/destination IP address, a time-to-live count, a source/destination MAC address, a VLAN tag, a TCP/UDP source/destination port number.

6. The method for packet processing according to a lookup table according to claim 1, wherein the priority order is sorted by a software.

7. A system for packet processing according to a lookup table, comprising:
   a receiver for receiving a packet, wherein the packet includes a packet header, and the packet header consists of control information;
   a memory, storing a lookup tablewith M entries, wherein each entry includes N conditions and a result/action indicator, and the M entries are sorted in a priority order; and
   a processor, wherein the processor matches the information with the N conditions, and applies the result/action indicator in the matched entry with the highest priority on the packet,
   wherein for each information in the packet header, a bit map array is given after the matching.

8. The system for packet processing according to a lookup table according to claim 7, wherein the bit map arrays from each information in the packet header are processed with a logic OR procedure to generate an aggregated bit map array.

9. The system for packet processing according to a lookup table according to claim 7, wherein the aggregated bit map arrays are processed with a logic AND procedure to generate a final aggregated bit map array with the priority order.

10. The system for packet processing according to a lookup table according to claim 7, wherein the result/action indicator indicates to let the packet pass, drop the packet, forward the packet, or modify the contents of the packet headers.

11. The system for packet processing according to a lookup table according to claim 7, wherein the information of the packet header includes an IP version, a source/destination IP address, a time-to-live count, a source/destination MAC address, a VLAN tag, a TCP/UDP source/destination port number.

12. The system for packet processing according to a lookup table according to claim 7, wherein the priority order is sorted by a software.

\* \* \* \* \*